March 1, 1955     J. B. SMITH     2,703,111
PIPE LINE REPAIR DEVICE
Filed July 26, 1952     2 Sheets-Sheet 1
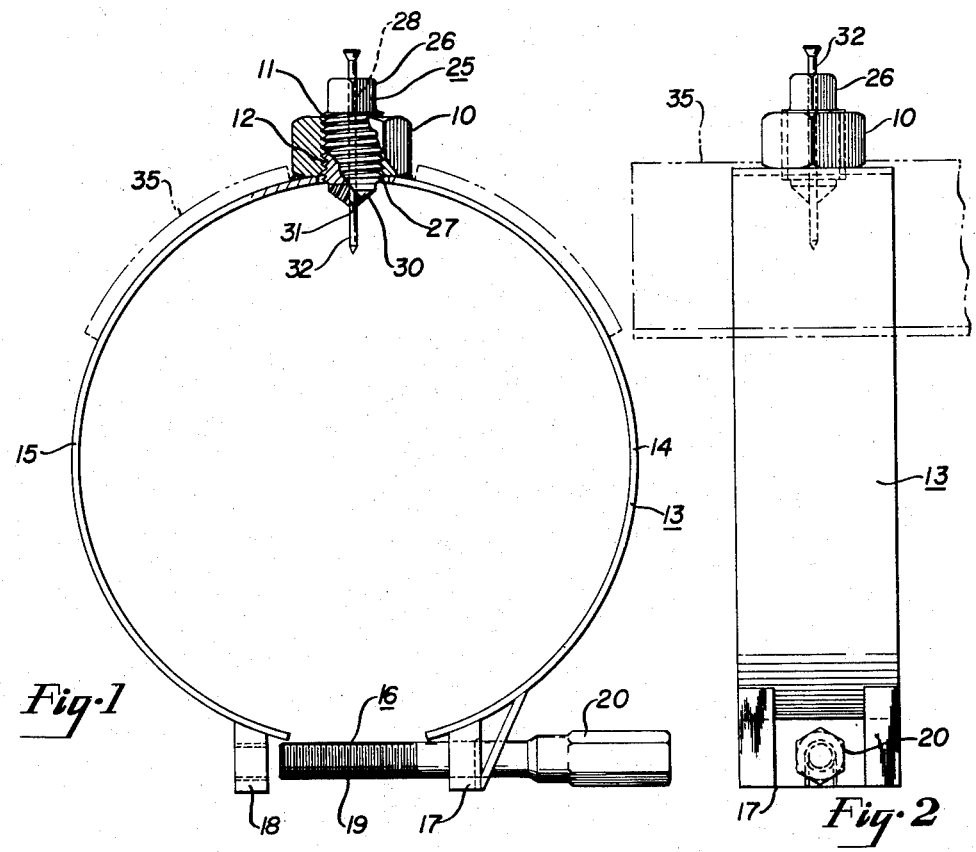
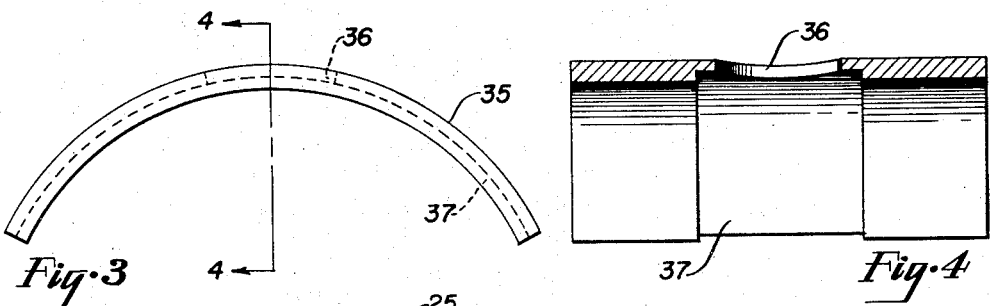
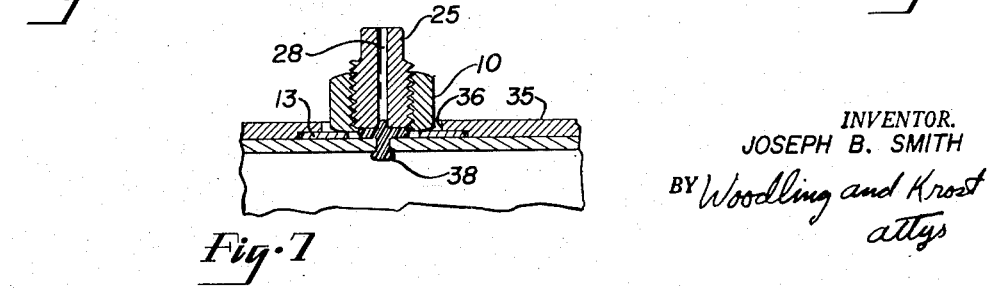
INVENTOR.
JOSEPH B. SMITH
BY Woodling and Krost
attys

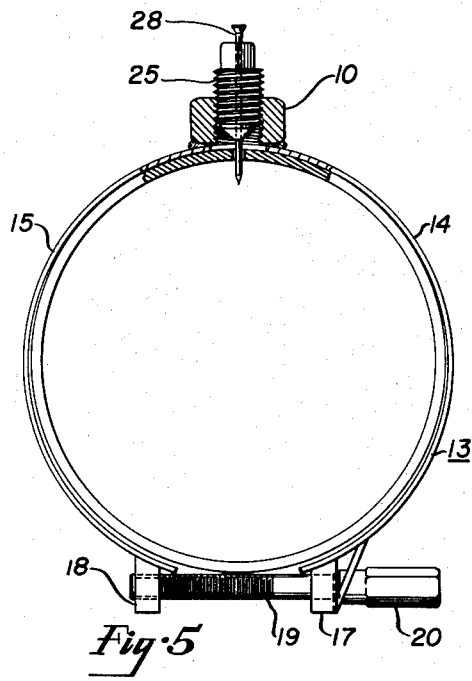
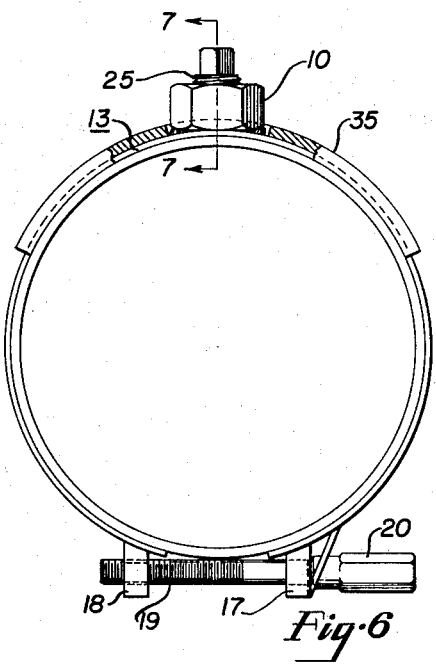
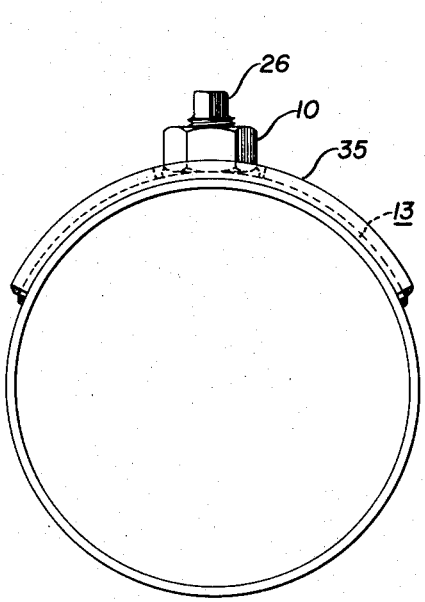
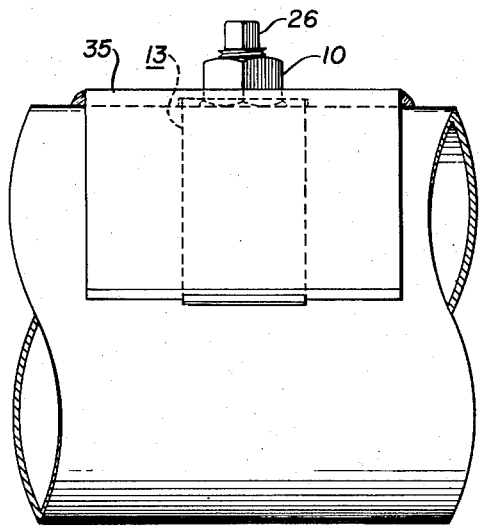

United States Patent Office 2,703,111
Patented Mar. 1, 1955

2,703,111

PIPE LINE REPAIR DEVICE

Joseph B. Smith, Berea, Ohio

Application July 26, 1952, Serial No. 301,146

4 Claims. (Cl. 138—99)

This invention relates in general to repair devices for sealing small apertures in pipe lines, storage tanks, and similar equipment holding fluids under pressure, and relates specifically to pipe line repair devices for sealing off leaks and small apertures with the pipe line remaining in service.

An object of this invention is to provide an improved device for sealing small apertures in fluid-containing equipment.

Another object of this invention is to provide such improved device with means encompassing the fluid container for holding the seal in position.

Another object of this invention is to provide a locator body which may be held stationary at the aperture to be closed, and a rammable member using the stationary body as a base to force a yieldable seal into the aperture.

Still another object of this invention is to provide the rammable member with an axial passageway for holding a probe member, the probe member serving to accurately center the ram over the aperture.

And another object of this invention is to provide a cone of yieldable material in order that a small total force by the ram will yield an immediate high p. s. i. at the cone apex to drive the apex into the aperture with a minimum total force.

And another object of this invention is to provide a metal seal cap which can be placed over the repair device and welded in place after the leak has been sealed off.

Other objects and a fuller understanding of the invention may be had by referring to the following description and claims, taken in conjunction with the accompanying drawings, in which:

Figure 1 is a side view of the preferred embodiment of the invention as applied to pipe line repairing, the full lines indicating the original repair device, and the dotted outline indicating the position assumed by an optional metal cap which may be welded in place after the aperture has been sealed;

Figure 2 is a side view of the device and optional cap;

Figure 3 is an end view of the optional weldable cap;

Figure 4 is a sectional view taken along line 4—4 of Figure 3;

Figure 5 is a sectional view of a pipe and a side view of the device of Figure 1 loosely located and installed upon a pipe;

Figure 6 is a similar view with the device fully installed and the aperture sealed;

Figure 7 is a sectional view taken along line 7—7 of Figure 6.

Figure 8 is a view of the device installed with the cap of Figure 3 welded in place and the bands and clamp of the device cut off; and Figure 9 is a side view of the installed device as shown in Figure 8.

Prior art devices for sealing leaks in pipe lines, hot water storage tanks, boilers, and other containers for a fluid under considerable pressure have been used for many years. There is, for example, the common type of sealing device generally employed for domestic hot water tanks, wherein a central self-threading screw is employed to draw the packing means down tightly around the leaking aperture. Such device is limited because of the fact that very often a naturally developed leak is accompanied by thin wall areas in the vicinity of the leaking aperture and is also undesirable because the aperture is made larger by the central screw.

For commercial use there is available an encompassing band device employing two oppositely disposed tightening clamps and a resilient rubber pad. The pad is quite large in order to be certain that the leaking aperture is covered. Because of the large pad area, an extreme amount of pressure must be exerted in order to get enough pressure per unit of area in order to counteract the pressure within the container. For example, if a pipe line contains oil under 3000 pounds per square inch, and a flat resilient pad two inches square is employed to seal a leak in such a container, then the pressure must be 3000 p. s. i. over the entire surface of the pad or a total force of 12,000 pounds. Obviously, such a pressure is extremely large and requires a heavy bracket with large bolts to draw the bracket tight enough. As a matter of fact with any safety factor whatsoever, much more than 12,000 pounds total force is required. Perhaps as much as 24,000 pounds total force would be used in order to assure complete sealing. For this reason prior banded devices have been quite large and cumbersome.

This invention employs a fundamentally different principle and is thereby able to employ practically negligible total pressures to easily seal extremely high internal pressures without difficulty and with ample safety factor. In order to accomplish such complex sealing with low total pressures, a cone of resilient sealing material is employed with the apex of the cone being accurately located with respect to the aperture to be sealed, and therefore a small total force produces an extremely large p. s. i. exactly where needed.

In Figure 1 of the drawings a pipe line repair device embodying the concepts of this invention is illustrated in the form which is preferred for pipe line repair work. In the description which follows, and in the claims, a pipe line repair device is referred to, but it is understood that this term includes any closed object having a high fluid pressure within. A locator body 10 is provided with a guideway opening 11 therethrough. The locator body 10 must be secured on the surface of the pipe line in a position to have the opening 11 centered around the aperture to be sealed. The illustrated device for holding the locator body 10 is desirable because of its simplicity and the fact that only the simplest type of tool is needed to install the securing means. The illustrated means for securing the locator body 10 is a band device 13 having a first band portion 14 and a second band portion 15 of substantially semi-circular form extending in opposite directions from the locator body 10 to a clamp position substantially diametrically opposite from the locator body 10. At the clamp position diametrically opposite from the body 10 a clamp device 16 is employed to draw the ends of the band portions 14 and 15 toward one another and tightly clamp the band device upon the pipe.

The location of the clamp device 16 is quite important. With prior devices two separate clamp devices have been employed and, therefore, require alternate tightening of one and then the other in order to tighten the band upon the pipe. Thus, a tendency to shift the resilient pad results. In an effort to assure the proper location of the pad with such two clamp devices, these prior art devices have been equipped with the large pads previously discussed and consequently have the undesirable feature of requiring a large sized pad to assure proper sealing regardless of shifting of the pad. With the device of this invention, however, wherein the clamp device 16 is diametrically opposite from the locator body 10, there is no tendency whatsoever to move the locator body as the clamp device 16 is tightened.

In Figure 1 the clamp device 16 is illustrated as comprising a lug 17 on leg portion 14 and a threaded lug 18 on leg portion 15, with a screw 19 extending through lug 17 and threadably engaged in lug 18. The screw 19 has a head portion 20 thereof formed to receive an actuation tool, such for example as a common box wrench.

In the illustrated embodiment of the invention the guideway opening 11 in the locator body 10 is illustrated as having internal threads 12 therein. A ram plug 25, in the illustrated embodiment being provided with a shank head 26 and a threaded external wall 27, is threadably engaged into the threads 12, and therefore may be advanced longitudinally along the axis of the guideway opening 11 by rotating the ram plug 25 with a common wrench.

Although it is quite conceivable to provide a power actuation device instead of the threaded engagement as illustrated and simply pin or lock the plug into position once actuated, the illustrated embodiment is preferred because of the fact that a simple wrench can be employed and because of the fact that threads will produce an extremely high force with relatively little force, the highest internal pressures can be readily sealed in this manner.

As before mentioned, it has been found that a cone 30 positioned on the end of the ram plug 25 is by far the most desirable because of the extreme high type force per unit of area which can be achieved with a minimum amount of total force. However, if a flat piece of sealing material is employed, the next feature of this invention will make a very small flat piece serviceable and, therefore, successful with relatively low total pressures. This next feature referred to consists of an axial hole 28 through the ram plug 25 and a corresponding axial hole 31 in the cone 30. A probe pin 32 may, therefore, be inserted through the passageway defined by the holes 28 and 31 and may be used to probe for the aperture to be sealed and, therefore, accurately position the yieldable sealing means over the aperture.

The illustrated embodiment of the device is useful for underwater lines handling petroleum products. In one South American location in particular there is a long underwater line to oil wells drilled far out in a large lake. Some organism in the lake is able to produce pin holes in iron pipe in a relatively short period of time. The oil spurting from the aperture thus produced clouds the entire area around the leak. Furthermore, the leak is very often at the bottom of the pipe in the sandy bottom of the lake. Visual location of the leaking aperture is, therefore, impossible. With the device of this invention employing the probe as described, the device is preliminarily assembled around the pipe without regard to the location of the locator body 10 with respect to the leak. Thereafter the repairman locates the leak by feel of the fluid spurting out of the leak. He then inserts the probe 32 through the axial passageway and begins to move the locator body until he feels the probe drop into the aperture. He can be certain that the probe is in the leaking aperture rather in a pock on the surface of the pipe because the pressure will tend to eject the probe. Such location can be done blindly. Once the probe is located in the leaking aperture, it may be held there until the clamp device 16 is tightened to permanently locate the locator body in the proper position, whenafter the probe may be withdrawn and the ram plug 25 tightened to drive the yieldable sealing means into the leaking aperture.

Although a flat sealing member will be serviceable when properly located as described, it is preferable that a cone be employed in order to give extreme pressure to drive the yieldable sealing material into and through the leaking aperture. It has been found that best pressure distribution can be obtained with a cone having the base thereof not more than three times the height.

Figure 5 of the drawings illustrates the condition achieved when the probe 32 drops into the leaking aperture. The band device 13 is loose, as illustrated.

The Figure 6 of the drawings illustrates the condition of the device after the band device 13 has been tightened and after the ram plug 25 has been rotated to drive the yieldable sealing means into place. Figure 7 of the drawings is a sectional view illustrating the condition of the yieldable sealing means after it has been compressed by the ram plug 25 to seal off the aperture. Note that the yieldable sealing means has been so tightly compressed that the hole 31 is completely eliminated and the sealing material substantially reformed as a solid mass without an opening. Furthermore, the sealing material will force through the leaking aperture and form a bulb 38 on the inner side of the pipe to aid in forming a perfect seal. The pressure tends to mushroom the bulb 38 over the inside of the pipe and, therefore, aids further in effecting a perfect seal.

The passageway formed by the holes 28 and 31 may be effectively employed without use of the probe pin 32 in many cases. For example, if the fluid is a gas rather than a liquid, the locator body 10 may be accurately positioned by placing the finger near the top of the ram plug 25; and when the hole 28 is properly located, the gas will blow from the hole 28 with considerable force. When off of the leaking aperture even the slightest amount, the force of the gas from the hole will be considerably reduced or nonexistent.

Although the device as described when properly installed is a complete and permanent repair for all pipe line leaks, it may be desirable in some instances to form a permanent metallic seal completely around the leak and eliminate the clamp device 16. If such seal is desired, a welding pad 35 having a central opening 36 therein to encompass the locator body 10 and having lateral grooves 37 therein to accommodate the thickness of the band portions 14 and 15 may be placed in position as illustrated by the dotted lines in Figure 1 and the full lines in Figures 6, 8 and 10. After placing the pad 35 in position, it is welded around all edges, including a full weld around the outside of the locator body 10 and the opening 36. Furthermore, the hole 28 and the threaded juncture of the ram plug 25 and the threaded opening 11 are welded shut. As the edge of the pad is welded or after all other edges have been welded, the bands may be cut off close to the edge of the pad, substantially as illustrated in Figures 8 and 9, and the lower portion of the bands together with the clamp device 16 may be removed. Thus, a complete metallic seal is provided in the event that any leaking should occur in the area of the original leak sealed by the yieldable sealing material.

With the illustrated embodiment of the invention a 3000 p. s. i. pressure has been sealed with a device weighing only six pounds completely assembled.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A pipe line repair device comprising, a locator body having a guideway opening therethrough, means to secure said locator body on the surface of a pipe with the axis of said guideway opening substantially normal to the surface of the pipe, a ram plug in said guideway opening, means to drive said plug axially and hold said ram plug in a selected position in said guideway opening with respect to the pipe surface, and a cone of resilient deformable sealing material at the end of said plug with the apex of the cone directed toward the pipe surface, said ram plug and cone having an axial opening defining a passageway through the ram plug and opening at the apex of the cone, an aperture locating and aligning probe device removably positioned in said passageway and extending to the exterior of said ram plug on one side and through the cone apex on the other side, said ram plug being operative to compress the sealing material with the probe positioned therein, and said probe being removable from the body of sealing material from the exterior after compression by the ram plug has been initiated, whereby the locator body may be positioned on the pipe surface with the guideway opening substantially centered upon an aperture in the pipe to be closed, and the plug may be driven against the sealing means until the sealing means is forced into sealing engagement in and around the aperture and held in such sealing engagement by the plug.

2. A pipe line repair device comprising, a locator body having a guideway opening therethrough, means to secure said locator body on the surface of a pipe with the axis of said guideway opening substantially normal to the surface of the pipe, a ram plug in said guideway opening, means to drive said plug axially and hold said ram plug in a selected position in said guideway opening with respect to the pipe surface, a body of deformable aperture sealing material at the end of said plug, said body of sealing material having a reduced surface contact area directed toward the pipe surface, said ram plug and said sealing material having an axial opening defining a passageway through the ram plug and sealing material, said passageway opening in said reduced surface contact area, an aperture locating and aligning probe removably positioned in said passageway and extending to the exterior of said ram plug on one side and out through the reduced contact area of the sealing material on the other side, said probe being removable from said passageway at any stage of compression of the sealing material, whereby the locator body may be positioned on the pipe surface with the guideway opening substantially centered upon an aperture in the pipe to be closed, and the plug may be driven against the sealing material until the sealing material is forced into sealing engagement in and around the aperture and held in such sealing engagement by the ram plug.

3. A pipe line repair device comprising, a body of sealing material having an opening therethrough, said body having a bulk configuration with a reduced surface contact area, said opening extending from said reduced surface contact area, said body of sealing material being compressible in the axial direction of said opening to close said opening and extrude into any leak hole or opening thereunder, compression means including a ram device to seat upon said sealing means, a passageway through said ram device providing an uninterrupted extension of said opening in the sealing means, a probe temporarily located in said opening and passageway, said probe extending through the sealing means at the reduced area side and extending through said passageway beyond the ram device on the exterior side thereof, said ram device being operative to compress the body of sealing material with the probe positioned therein, said probe being removable from the body of sealing material from the ram device side after compression by the ram device has been initiated, the opening through the sealing material being closable and sealable by further compression of the sealing material by the ram device, and clamp means serving to hold the sealing material and compression means in a selected position upon a pipe.

4. A pipe line repair device, comprising, a body of sealing material having an opening therethrough, said body of sealing material having a generally pointed end and producing a reduced surface contact area, said opening extending from said reduced surface contact area, said body of sealing material being compressible in the axial direction of said opening to close said opening and extrude into any leak hole or opening thereunder, compression means including a ram device to seat upon said sealing means, a passageway through said ram device providing an uninterrupted extension of said opening in the sealing means, a probe temporarily located in said opening and passageway, said probe extending through the sealing means at the reduced area side and extending through said passageway beyond the ram device on the exterior side thereof, said ram device being operative to compress the body of sealing material with the probe positioned therein, said probe being removable from the body of sealing material from the ram device side after compression by the ram device has been initiated, the opening through the sealing material being closable and sealable by further compression of the sealing material by the ram device, and clamp means serving to hold the sealing material and compression means in a selected position upon a pipe.

References Cited in the file of this patent

UNITED STATES PATENTS

| | | |
|---|---|---|
| 631,179 | Rucker | Aug. 15, 1899 |
| 1,806,867 | Welsh | May 26, 1931 |
| 2,077,050 | Merrill | Apr. 13, 1937 |
| 2,199,552 | Watson | May 7, 1940 |
| 2,224,918 | Merrill | Dec. 17, 1940 |
| 2,236,913 | Merrill | Apr. 1, 1941 |
| 2,586,640 | Furman | Feb. 19, 1952 |

FOREIGN PATENTS

| | | |
|---|---|---|
| 40,063 | Norway | 1924 |

OTHER REFERENCES

Publication by M. B. Skimer Co., Repair Clamps and Saddles for Steel and Cast Iron Pipe, Catalog No. 36, January 15, 1937.